UNITED STATES PATENT OFFICE.

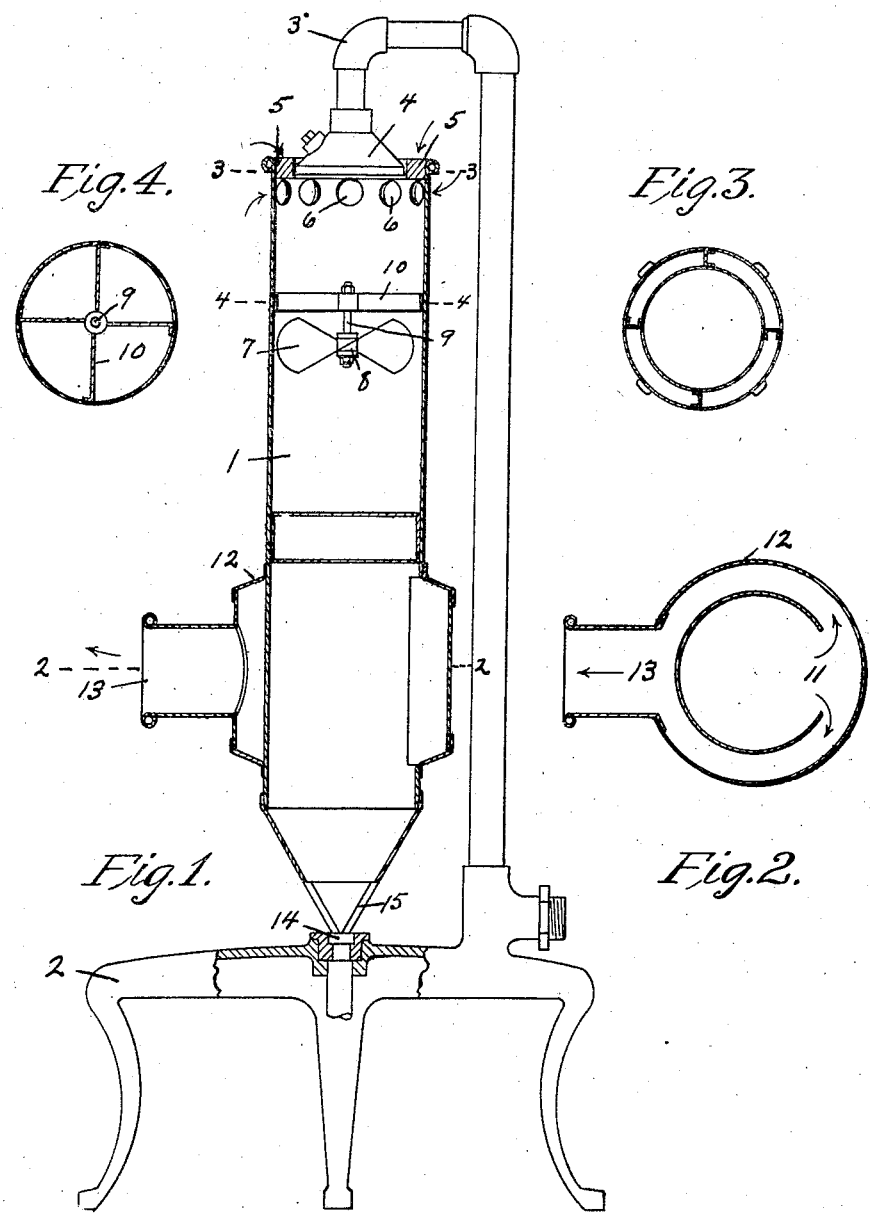

CARL F. LUNDEBERG, OF HARTFORD, CONNECTICUT.

AIR PURIFYING AND COOLING DEVICE.

1,109,171.  Specification of Letters Patent.  Patented Sept. 1, 1914.

Application filed April 3, 1913. Serial No. 758,592.

*To all whom it may concern:*

Be it known that I, CARL F. LUNDEBERG, a citizen of the United States, residing at 36 Willow street, city of Hartford, in the county of Hartford and State of Connecticut, have invented certain new and useful Improvements in Air Purifying and Cooling Devices, of which the following is a specification.

One object of the invention is to cool the atmosphere in a room.

A further object of the invention is to purify the air furnishing a humid, cool and mild atmosphere free of all dust, etc.

A further object is to provide a current of purified cool air without the use of any force other than that of the water entering the device being under pressure.

Figure —1— is a lateral view partially in section. Fig. —2— is a cross section on line 2—2 of Fig. —1—. Fig. —3— is a cross section on line 3—3 of Fig. —1—. Fig. —4— is a cross section on line 4—4 of Fig. —1—.

Referring to the drawings as the illustrated embodiment of the invention, a cylinder —1— is preferably rotatably mounted in an upright position in a standard —2—. A supply of water is furnished preferably at the top of said cylinder by means of a pipe —3— preferably having a sprinkler —4— from which water under pressure is directed downward in said cylinder. Adjacent to said sprinkler —4— as through openings —5— at each side thereof and through apertures 6—6 in the side of said cylinder air is allowed to enter and come in contact with said water under pressure. The said pressure of the water causes a suction in the cylinder which draws in the air through the said openings. The sprinkler might furnish the water in the form of a fine spray, but preferably it is furnished in jets and mixed with the air by the following means.

A fan —7— with diagonal blades is preferably mounted on a suitable bearing —8— held in place on a spindle —9— which is secured in a frame —10—, Fig. —4—, said frame is secured to the sides of the said cylinder in any suitable manner. As the jets of water under pressure strike the fan operating the same the water forms a spray having a whirling action which is thus mixed with the air. After the air is thus cooled and purified it is separated from the water by the following means: The cylinder has an opening, as at —11—, Fig. —2—, and a sleeve —12— around said cylinder providing an air space between the sleeve and the cylinder, said air space being in communication with an air outlet as at —13—. The air escapes through the opening —11— and thence around inside the sleeve —12— to and through the outlet —13—, while the water runs down to the bottom of the cylinder which is preferably funnel shaped and has a water outlet as at —14—. As the water still has a whirling action caused by the fan in order to prevent air escaping through the water outlet and in order to have the outlet take off the water as fast as possible, I provide a stop —15— in the side of the funnel of the cylinder to prevent the whirling action of the water and thus keep the outlet filled with water continually. This is especially necessary because the pressure of the water from the sprinkler puts the air somewhat under pressure and in order that the air may all escape through the air outlet, it is necessary that the funnel contain water.

I prefer to supply a single room with purified and cooled air, but the device may be large enough to supply other rooms if necessary, and the air from the air outlet may be directed and supplied to any room desired.

The operation of the device is simple and it is apparent that the details may be greatly varied without departing from the spirit of the invention.

What I claim is:

1. In an air purifying and cooling device, a cylinder having a plurality of inlets for said air at the top thereof, a sprinkler adjacent to said inlets supplying water under pressure, a fan in the path of said water rotated thereby to mix said air and water in the form of a spray having a whirling action and means for separating the air from said water.

2. In an air purifying and cooling device, a cylinder having an air inlet at the top thereof, a sprinkler supplying water under pressure to be mixed with said air within said cylinder, means for separating the air from said water, said means consisting of a sleeve forming an air chamber between itself and said cylinder, said sleeve having an air outlet at one side thereof out of alinement of an opening on the side of said cylinder whereby air may escape through said opening around said cylinder to the air outlet in said sleeve.

3. In an air purifying and cooling device, a cylinder having an air inlet, a sprinkler supplying water under pressure adjacent thereto, means for mixing said air and water in a whirling action, means of separating said air and water, and an outlet for said water having arranged adjacent thereto means for checking the whirling action of said water whereby said water cannot rise and circulate into the air outlet thereabove substantially as described.

4. In an air purifying and cooling device a cylinder having an air inlet, a sprinkler supplying water under pressure adjacent thereto, means for separating said air and water consisting of an opening on the side of said cylinder and a sleeve providing an air chamber encircling said cylinder and having an air outlet therein on the opposite side of said cylinder from said opening therein.

5. In an air purifying and cooling device a cylinder having a plurality of air inlets at the top thereof, a sprinkler supplying water under pressure adjacent to said inlets; said water from said sprinkler being in the form of jets traveling substantially parallel to each other and parallel to the sides of said cylinder; said jets of water operating a fan, without other motive power, adapted in its revolutions to crush succeeding jets of water, thereby mixing said water and said air, and means for separating said air and said water, substantially as described.

6. In an air purifying and cooling device a cylinder having a plurality of air inlets at the top thereof; a sprinkler supplying water under pressure adjacent to said inlets; said water from said sprinkler being in the form of jets traveling substantially parallel to each other and parallel to the sides of said cylinder; said jets of water operating a fan, without other motive power, adapted in its revolutions to crush succeeding jets of water, thereby mixing said water and said air, and means for separating said air and said water; said means consisting of a sleeve providing an air chamber between itself and said cylinder; an air outlet in said sleeve out of alinement with an air outlet in said cylinder, substantially as described.

In testimony whereof I affix my signature in presence of two witnesses.

CARL F. LUNDEBERG.

Witnesses:
  GEO. B. WARD,
  ROSE SOLOMON.